United States Patent [19]
Meenen

[11] 3,716,689
[45] Feb. 13, 1973

[54] HIGH FREQUENCY DIELECTRIC HEATING PROCESS AND APPARATUS

[75] Inventor: Raymond P. Meenen, Hawthorne, N.J.

[73] Assignee: Mayflower Electronic Devices, Inc., Little Ferry, N.J.

[22] Filed: March 15, 1971

[21] Appl. No.: 124,427

Related U.S. Application Data

[62] Division of Ser. No. 824,076, May 13, 1969, Pat. No. 3,596,035.

[52] U.S. Cl. ............219/10.61, 156/274, 219/10.23, 219/10.81
[51] Int. Cl. ................................................H05b 9/04
[58] Field of Search..219/10.61, 10.53, 10.47, 10.73, 219/10.81; 156/273, 274, 380

[56] References Cited

UNITED STATES PATENTS

| | | | |
|---|---|---|---|
| 2,842,649 | 7/1958 | Jehier | 219/10.47 |
| 2,539,646 | 1/1951 | Welch | 219/10.53 |
| 3,532,848 | 10/1970 | Loring et al. | 219/10.61 |
| 2,621,138 | 12/1952 | Messing | 219/10.53 X |
| 2,583,128 | 1/1952 | Stevenson et al. | 156/274 X |
| 2,650,288 | 8/1953 | Bradley et al. | 219/10.53 |

*Primary Examiner*—J. V. Truhe
*Assistant Examiner*—B. A. Reynolds
*Attorney*—Leo C. Krazinski

[57] ABSTRACT

A high frequency heating machine for laminating fabrics material in which a heating electrode for each side of the material is divided into two parts and in which each of the four electrodes is preheated, the two electrodes one one side of the material dividing the load and having capacitors therebetween. Mechanism is provided for step-by-step passage of the material between the two opposing sets of electrodes in which the dies are spaced three times the effective width of one die and in which the stroke of the material for each step is twice the effective width of one die.

1 Claim, 6 Drawing Figures

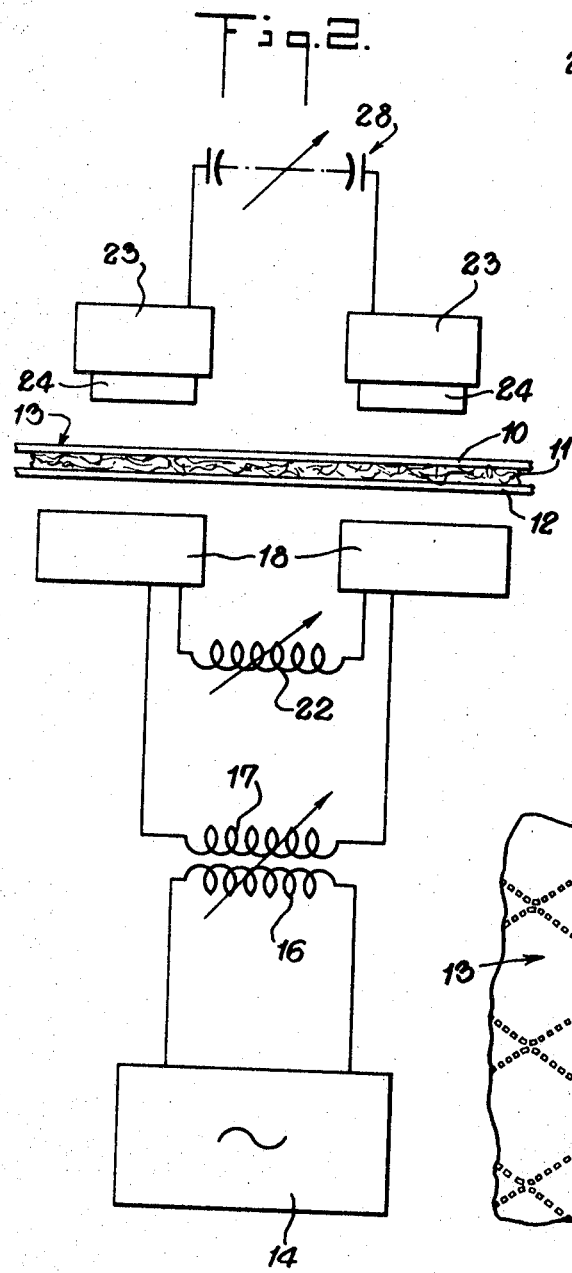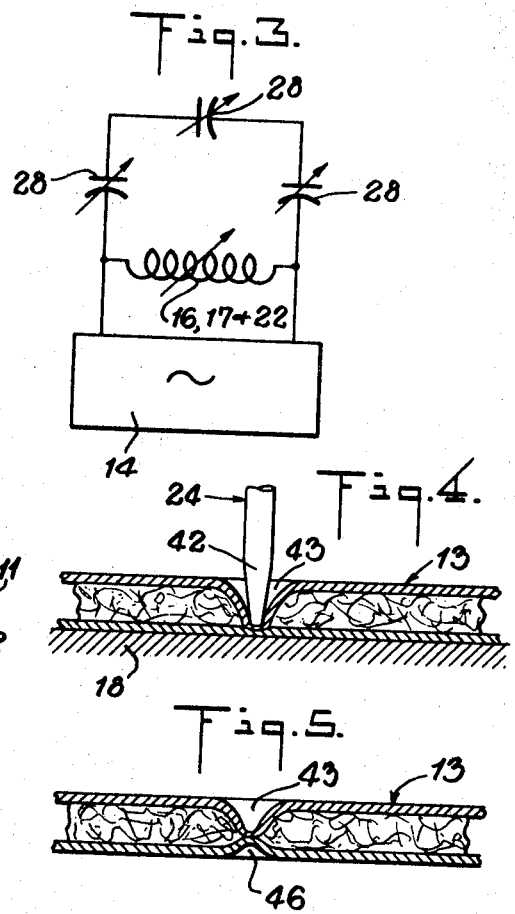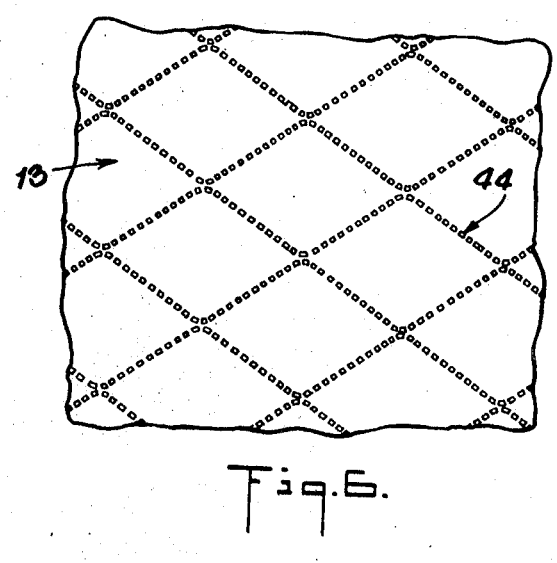

HIGH FREQUENCY DIELECTRIC HEATING PROCESS AND APPARATUS

This is a division of application, Ser. No. 824,076, filed May 13, 1969 now U.S. Pat. No. 3,596,035.

BACKGROUND OF THE INVENTION

Field of the Invention

The present invention relates to high frequency dielectric heating and, particularly, to a process and apparatus for electronic quilting of a plurality of fabrics.

It has been found that an electrode or platen is at a lower temperature, that is, cooler than the fabric, so that the platen initially absorbs heat from the fabric while the fabric is being heated. Because of this transference of heat from the fabric to the platen a substantial amount of high frequency energy is required in heating the fabric which high frequency energy at times breaks through the fabric to render the laminated fabric unsuitable for use.

It has also been found that fabrics because of their low power factors and poor insulating properties, in view of their porous construction, are difficult to heat to a point of fusion while using conventional methods.

Further, in conventional high frequency heating arrangements, the movable or press platen is generally a single unit which requires a high load capacity particularly when large width fabrics are to be laminated, so that the frequency range is limited.

SUMMARY OF THE INVENTION

Accordingly, an object of the invention is to provide a high frequency dielectric heating apparatus which overcomes the difficulties and disadvantages heretofore encountered.

Another object is to provide such apparatus which renders more efficient the heating platens in laminating the fabric material.

Still another object is to provide such apparatus which reduces the effective load capacity and shortens the connections between the platens and oscillator generating the high frequency power.

Yet another object is to provide such apparatus which enables the press platens that complete the load circuit to capacitatively raise the resonant frequency of the load circuit.

Other and further objects will be obvious upon an understanding of the illustrative embodiment about to be described, or will be indicated in the appended claims and various advantages not referred to herein will occur to one skilled in the art upon employment of the invention in practice.

In accordance with the present invention the foregoing objects are generally accomplished by providing apparatus for joining by thermal activation a plurality of fabrics to produce a quilted material similar in appearance to that presently produced by sewing; which apparatus comprises a high frequency oscillator mounted within the press itself and inductively coupling it to two separate stationary platens, separate adjustable inductors in parallel therewith for resonating the load to the oscillator frequency and for distributing the power on the platens so as to seal the fabrics uniformly, two movable platens having dies thereon in registration with the stationary platens and arranged to complete the electrical load circuit, and capacitors connected between the movable platens to raise the resonant frequency of the load circuit.

BRIEF DESCRIPTION OF THE DRAWINGS

A preferred embodiment of the invention has been chosen for purposes of illustration and description and is shown in the accompanying drawings, forming a part of the specification, wherein:

FIG. 2 is a schematic view of the high frequency heating device shown in FIG. 1.

FIG. 3 is an equivalent electric circuit of the device shown in FIG. 2.

FIG. 4 is an enlarged sectional view of a portion of the upper and lower dies in pressurized contact with fabric material.

FIG. 5 is an enlarged sectional view of a portion of a completed quilted fabric illustrating undulations produced by the upper and lower dies.

FIG. 6 is an enlarged fragmentary top plan view of a typical design in quilted fabric.

Referring now to FIG. 1 of the drawings in detail, there is shown apparatus for forming a laminated or quilted structure comprising a wadding sandwiched in by two layers of fabric. The top layer 10 of fabric, as shown in FIG. 1, is usually nylon, the middle layer 11 is wadding and the bottom layer 12 of fabric may be of any suitable material, which is compatible and sealable with the wadding. If the bottom layer 13 is scrim or or similar, it must be coated with a suitable material, heavy enough to provide the necessary seal. If the bottom layer is nylon, care must be used to prevent oversealing, a heavier nylon or one with a higher melting temperature than the top nylon layer 10 may be necessary.

Figure 1:
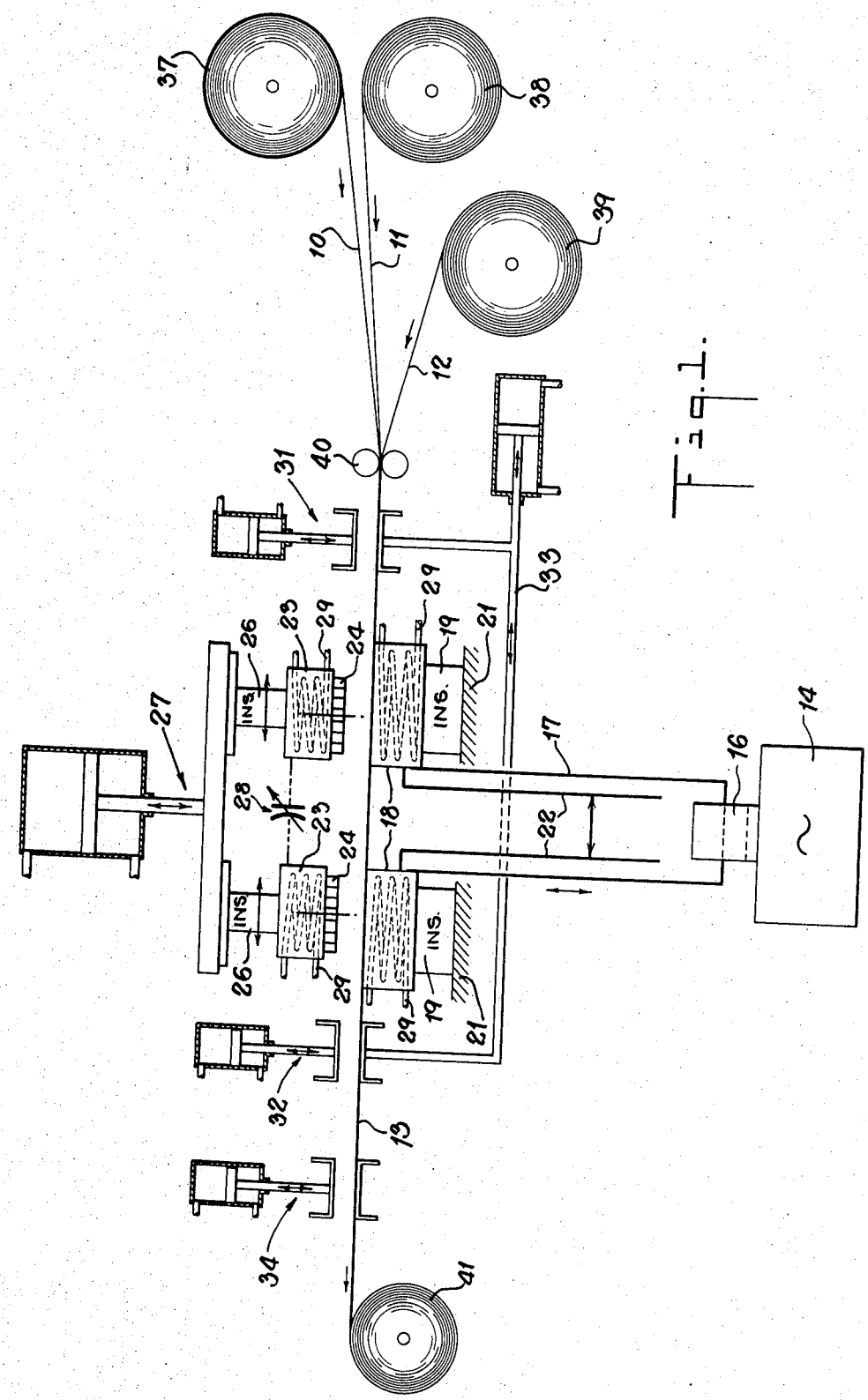
FIG. 1 is a diagrammatic view of apparatus for carrying out the process of the invention.

The wadding 11 should be thick enough to provide the desired puff and sealing and should be coated with a material that is compatible with the top and bottom layers and will promote sealability therewith. This coating (not shown), if it has a high dielectric loss factor, will aid the heating and produce a better seal. The wadding must be clean and free of any material that is conductive, to prevent arcs, and must be uniform in thickness with no lumps or voids.

The nylon top layer 10 must be heavy enough to permit some of it to melt and fuse to the wadding 11 without too much loss of strength. Its melting temperature and chemical composition should be compatible with the wadding and, if any coating is applied thereto, this also must be compatible to the wadding.

According to the invention herein, the three fabrics 10, 11 and 12 are joined together thermally to produce a quilted material 13 similar in appearance to that produced by sewing but more ornamental in that discontinuous patterns, not possible with the stitch sewing method, can be made. The means for heating the fabrics comprise an oscillator 14 for generating a high frequency which may include frequencies in the very high and ultra high frequency bands. The oscillator 14 is provided with a slotted stub 16 which meshes with the lower end of a press pick-up stub 17, which at its upper end is adjustably secured to a pair of spaced, stationary electrodes, termed herein, lower press platens 18, which are supported upon insulating members 19 and in turn upon the machine proper 21 (shown schematically as a ground line to simplify the disclosure).

The press pick-up stud 17 controls the amount of power that can be drawn from the oscillator 14. If the stub 17 is raised too high, that is, adjacent the upper edge of the slotted stub 16, very little power will be drawn and the tuning will be sharp. If the stub 17 is dropped too low in the slotted stub 16, the oscillator 14 will be overloaded and will become erratic, it may jump to some other frequency, it may arc internally or it may cease high plate current. An optimal position of the stub 17 is about medium depth in the slotted stub 16, as shown in FIG. 1, for proper sealing of the fabrics.

Tuning stubs 22, adjustably fastened to the lower platens 18 are provided for changing both the distribution of power and the tuning point, which changes may be necessary when sealing dies are changed. When sealing dies of different length are used, wider or narrower tuning stubs 22 may be required to obtain uniform power over the full length of the machine.

Sealing dies for the lower platens 18 are not required in the embodiment shown but are required with the two upper spaced electrodes or press platens 23. These sealing dies 24 must be made of matched pairs, matched in height and sealing area and are machined to produce a desirable pattern. The press or machine of this invention can accommodate dies up to 72 inches long and of an effective width between 4 inches and 6 inches. One of the dies, that is, the second one in the line of travel downstream to make a seal, must be adjustable to compensate for shrinkage in the material that occurs in the quilting operation and in the material itself. The patterns used in the quilting operation should be tolerant of some die registration error without being too obvious in the finished product. The sealing edges of the dies should be serrated to permit interruptions in the melting of the material and thereby produce a seal without excessive weakening of the material. If plain unserrated dies were used, they would greatly reduce the strength of the material. The edges around each serration must be rounded to prevent cutting and arcing, but this should be done with minimal reduction of sealing surface. The height of the sealing elements must be matched to a plus or minus 0.0005 inch for good uniform sealing.

The sealing dies 24 on the upper press platens 23 must be spaced to properly register the desired pattern to be impressed on the fabric. The spacing center to center should be three (3) times the effective width of one sealing die 24. The effective width is the distance from a point on the seal made by one die to the corresponding point on the seal made by the other die on the finished fabric material. The material shrinkage should be taken into account and the dies adjusted accordingly. The die size is a multiple of the index spacing, each die having one-half of the index pattern and the dies may be operated so one pattern interlocks the other or that is superimposed over the other, as is required to produce the desired effect.

The upper press platens 23 are secured to insulating members 26, which are adjustably mounted for sidewards movement, as shown by the arrows, to a conventional hydraulic press 27 for vertical reciprocal movement thereof. Bridged across the two upper press platens 23 are four variable capacitors 28 for providing adjustable tuning. Each of the capacitors 28 has a range of from 12 to 25 picofarads. Provision is also made for a 32 KV vacuum capacitor to be connected across them when required. These capacitors 28 are adjusted and combined with suitable vacuum capacitors to resonate the press at the same frequency as that of the oscillator 14. Such adjustment of the capacitors 28 also distributes the voltage along the dies 24 so as to obtain a uniform seal over the entire sealing area. In some instances it has been found expedient to also adjust the tuning stubs 22 in conjunction with the capacitors 28. By thus splitting the load by use of two platens at opposite sides and bridging the upper platens 23 with the capacitors 28 it has been possible to efficiently perform the quilting operation at 40–60 megacycles.

Referring again to the upper and lower platens 23 and 18, respectively, it is to be noted that the use of divided, insulated platens reduces the effective load capacity and shortens the connections to the oscillator 14 which generates the high frequency power. This permits operation at a much higher frequency than has heretofore been possible using conventional techniques. This is accomplished by mounting the high frequency power oscillator 14 within the press and inductively coupling it to the two lower press platens 18.

It is known that fabrics because of their low power factors and poor insulating properties, since fabrics are of porous construction, are difficult to heat to a point of fusion while using conventional methods. It has been found that as the frequency was raised the seals produced were improved. But the problem was to obtain the highest frequency possible and still maintain uniform power on the large press platens used with production type machines. The solution found was in elevating the sealing die temperature, so that satisfactory seals were produced while using less high frequency power. Accordingly, as shown in FIG. 1, each of the upper and lower press platens 18 and 23, respectively, are heated by placing hoses 29, preferably of teflon, around each platen and then circulating heated fluid therethrough. Such fluid should be a fire resistant fluid that transfers heat efficiently, an example of such a fluid being Monsanto Therminol type FR-1. Of course, other conventional means for heating the platens may be provided. The temperature to which the press platens are raised is limited by the surface deterioration that occurs in the fabric material; consequently, the amount of heat imparted to the platens must be carefully controlled. It is thus apparent that the proper combination of thermal heat, high frequency heat and ram pressure will vary with the fabric materials being sealed. In accordance with the present invention, preheating the platens to about 350°F and maintaining the platens at this temperature has been satisfactory. With the platens at a temperature of 350°F it is obvious that less high frequency heating power is required to operate the platens at a temperature of about 480°F in performing the quilting operation.

The fabric material used in the quilting operation is moved intermittently, that is, indexed, in a horizontal direction from right to left, as seen in FIG. 1, through the sealing machine by feed clamps 31 at the input side and feed clamps 32 at the output side of the machine. Both sets of feed clamps 31 and 32 are mechanically interconnected by conventional means 33 and simultaneously close to grip the fabrics and move them to the left a predetermined distance, under conventional controls. In this embodiment the lateral movement of the clamps 31 and 32, that is, the stroke thereof, was set to two (2)

times the effective width of one sealing die 24. An extra hydraulic clamp 34 is shown downstream of the output feed clamp 32 for holding the quilted fabric material 13 while the clamps 31 and 32 are returning (to the right) to their initial positions.

In operation, the top layer 10, wadding 11 and bottom layer 12 are schematically shown carried on supply rolls 37, 38 and 39, respectively. Initially the platens are preheated and the electronic equipment including the oscillator 14 are energized. The three fabric materials are then drawn manually through the rollers 40, past the opened input feed clamp 31, press platens 18 and 23, output feed clamp 31 and just beyond the opened clamp 34, after which the automatic control system (not shown) is energized, whereby the hydraulic press 27 moves the pre-heated upper press platens 23 and dies 24 downwardly into engagement with the three fabric materials to seal them together as a quilted fabric 13. Upon completion of the sealing operation the cycling of the system continues in that the clamps 31 and 32 close and grip the material, clamp 34 being open, and move the same a predetermined distance downstream, in the particular example, twice the width of the die 24.

Since the die 24 has a width of 6 inches and since the center-to-center distance of the dies 24 were set to 18 inches, the fabric material is moved by the clamps 31 and 32, a distance of 12 inches, after which the clamps 31 and 32 are opened, and clamp 34 is closed in order to hold the fabric, while the clamps 31 and 32 are returned to the right, as viewed in FIG. 1, to their starting positions. The hydraulic press 27 is again operated to quilt the material, following which the cycle is repeated and quilted fabric 13 carried to and rolled upon the take-up roll 41.

It is believed that the schematic illustration in FIG. 2 is clear as to its reference to the embodiment of FIG. 1 without further explanation. Also, FIG. 3 is shown merely as an equivalent schematic circuit of that shown in FIG. 2.

In FIG. 4, there is shown an enlarged sectional view of the quilted fabric 13 under pressurized contact between the die 24 and the lower platen 18 wherein a ridge 42 is shown penetrating the laminated material 13 to form a recess 43 therein in accordance with the pattern 44, see FIG. 6, of the sealing die 24. In FIG. 5 the quilted material is shown after the die 24 has been disengaged therefrom and it will be noted that a recess 46 is formed on the bottom surface thereof, although the bottom platen 18 has a flat top surface engaging the fabric material.

From the foregoing description, it will be seen that the present invention provides an improved high frequency heating process for efficiently quilting fabrics by use of preheated, split platens and by use of capacitors interconnecting the upper press platens for producing the desired loading effect at the operating frequency.

What is claimed is:

1. A high-frequency dielectric heating process for laminating fabric which includes the steps of preheating a spaced pair of upper and a spaced pair of lower opposed platens or electrodes, inductively coupling a high frequency power to the lower platens for setting up a high frequency field between said opposed platens, in which the inductive coupling is adjustable, capacitatively interconnecting the upper platens to produce a desired loading effect at operating frequency, in which the capacitance is adjustable, inductively interconnecting with a variable inductance the lower platens, passing intermittently a plurality of superimposed fabrics in a longitudinal direction between said opposed platens, and reciprocating said upper platens toward said lower platens to apply pressure and heat to said fabric, whereby the fabrics are sealed to form a quilted fabric.

* * * * *